United States Patent [19]
Weder

[11] Patent Number: 5,934,044
[45] Date of Patent: Aug. 10, 1999

[54] METHOD OF FORMING A FLOWER POT OR FLOWER POT COVER HAVING A LABEL INCORPORATED THEREIN

[75] Inventor: Donald E. Weder, Highland, Ill.

[73] Assignee: Southpac Trust International, Inc.

[21] Appl. No.: 09/016,656

[22] Filed: Jan. 30, 1998

Related U.S. Application Data

[62] Division of application No. 08/429,255, Apr. 25, 1995, Pat. No. 5,807,224, which is a division of application No. 08/234,198, Apr. 26, 1994, Pat. No. 5,533,319, which is a continuation of application No. 08/068,482, May 28, 1993, Pat. No. 5,335,476, which is a continuation-in-part of application No. 07/979,510, Nov. 19, 1992, abandoned, and a continuation-in-part of application No. 07/965,585, Oct. 23, 1992, abandoned, which is a continuation of application No. 07/893,586, Jun. 2, 1992, Pat. No. 5,181,364, which is a continuation of application No. 07/707,417, May 28, 1991, abandoned, which is a continuation of application No. 07/502,358, Mar. 29, 1990, abandoned, which is a continuation-in-part of application No. 07/249,761, Sep. 26, 1998, abandoned, which is a continuation-in-part of application No. 07/219,083, Jul. 13, 1988, Pat. No. 4,897,031, which is a continuation of application No. 07/004,275, Jan. 5, 1987, Pat. No. 4,773,182, which is a continuation of application No. 06/613,080, May 22, 1984, abandoned.

[51] Int. Cl.⁶ ............................ B65B 25/02; B65B 11/02
[52] U.S. Cl. .................. 53/397; 53/399; 53/411; 53/413; 53/465; 493/55; 493/154
[58] Field of Search .................... 53/397, 399, 411, 53/413, 465; 493/53, 55, 93, 154, 187

[56] References Cited

U.S. PATENT DOCUMENTS

| | | | |
|---|---|---|---|
| 2,367,749 | 1/1945 | Barbieri | 493/154 |
| 2,563,633 | 8/1951 | Amberg | 93/36.2 |
| 3,027,263 | 3/1962 | Wanamaker | 99/172 |
| 3,232,469 | 2/1966 | Piazze | 215/38 |
| 3,245,697 | 4/1966 | Nugent | 283/7 |
| 3,251,141 | 5/1966 | MacRae | 35/9 |
| 3,271,922 | 9/1966 | Wallerstein et al. | 53/3 |
| 3,508,372 | 4/1970 | Wallerstein et al. | 53/3 |
| 3,550,421 | 12/1970 | Stakel | 72/327 |
| 3,603,218 | 9/1971 | Ludder | 93/36 |
| 3,800,497 | 4/1974 | Pearson | 53/14 |
| 3,886,083 | 5/1975 | Laxer | 283/95 |
| 4,229,925 | 10/1980 | Stirniman | 53/399 |
| 4,413,725 | 11/1983 | Bruno et al. | |
| 4,432,630 | 2/1984 | Haas | 283/95 |
| 4,546,875 | 10/1985 | Zweber | 206/0.82 |
| 4,555,025 | 11/1985 | Weinberg et al. | 206/497 |
| 4,846,503 | 7/1989 | Strauss | 283/70 |
| 4,972,657 | 11/1990 | McKee | 53/411 |
| 5,005,873 | 4/1991 | West | 283/92 |
| 5,073,161 | 12/1991 | Weder et al. | 493/154 |
| 5,109,153 | 4/1992 | Johnsen et al. | 235/468 |
| 5,111,637 | 5/1992 | Weder et al. | 53/397 |

(List continued on next page.)

OTHER PUBLICATIONS

Brochure, *Speed Cover the Original Preformed Pot Cover,* 1989 Highland Supply Corporation.

Brochure, *Speed Sheets and Speed Rolls Pressure Sensitive Floral Wrap,* 1990 Highland Supply Corporation.

*Primary Examiner*—James F. Coan
*Assistant Examiner*—Gene L. Kim
*Attorney, Agent, or Firm*—Dunlap, Codding & Rogers, P.C.

[57] ABSTRACT

A method of forming a flower pot or a flower pot cover is provided. The method includes the step of providing a sheet of material having an upper surface and a lower surface with at least one of the upper and lower surfaces being a bondably connectable surface. The sheet of material has a label area which has information related to a floral grouping displayed thereon. The method further includes forming the sheet of material into a base having a closed lower end, an open upper end, and an object opening extending through the open upper end and dimensioned to receive a flower pot in which the floral grouping is disposed. The base is formed to have a plurality of overlapping folds that are bondably connected so as to retain the base in a predetermined shape with the information on the label area being viewable when the flower pot is disposed in the object opening.

6 Claims, 4 Drawing Sheets

U.S. PATENT DOCUMENTS

| | | | |
|---|---|---|---|
| 5,111,638 | 5/1992 | Weder | 53/397 |
| 5,172,936 | 12/1992 | Sullivan et al. | 283/81 |
| 5,176,609 | 1/1993 | Weder et al. | 493/154 |
| 5,181,364 | 1/1993 | Weder | 53/397 |
| 5,221,248 | 6/1993 | Weder et al. | 493/133 |
| 5,254,072 | 10/1993 | Weder et al. | 493/154 |
| 5,286,246 | 2/1994 | Weder et al. | 493/154 |
| 5,335,477 | 8/1994 | Weder | 53/399 |
| 5,354,723 | 10/1994 | Gundjian | 283/95 |
| 5,368,334 | 11/1994 | Christy | 283/95 |
| 5,493,843 | 2/1996 | Weder | 53/399 |
| 5,533,319 | 7/1996 | Weder | 53/399 |
| 5,606,845 | 3/1997 | Weder | 53/399 |
| 5,622,029 | 4/1997 | Weder | 53/399 |

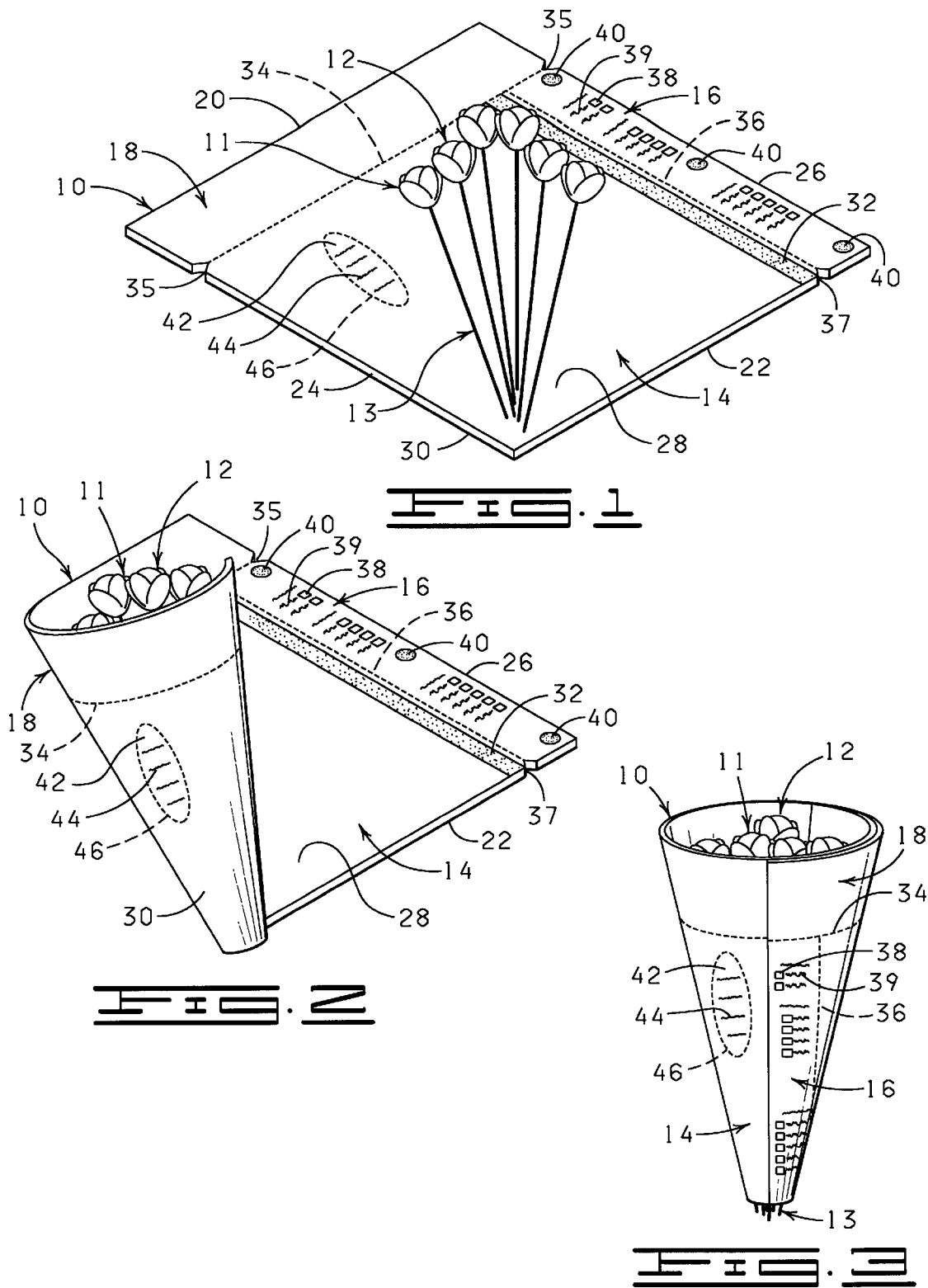

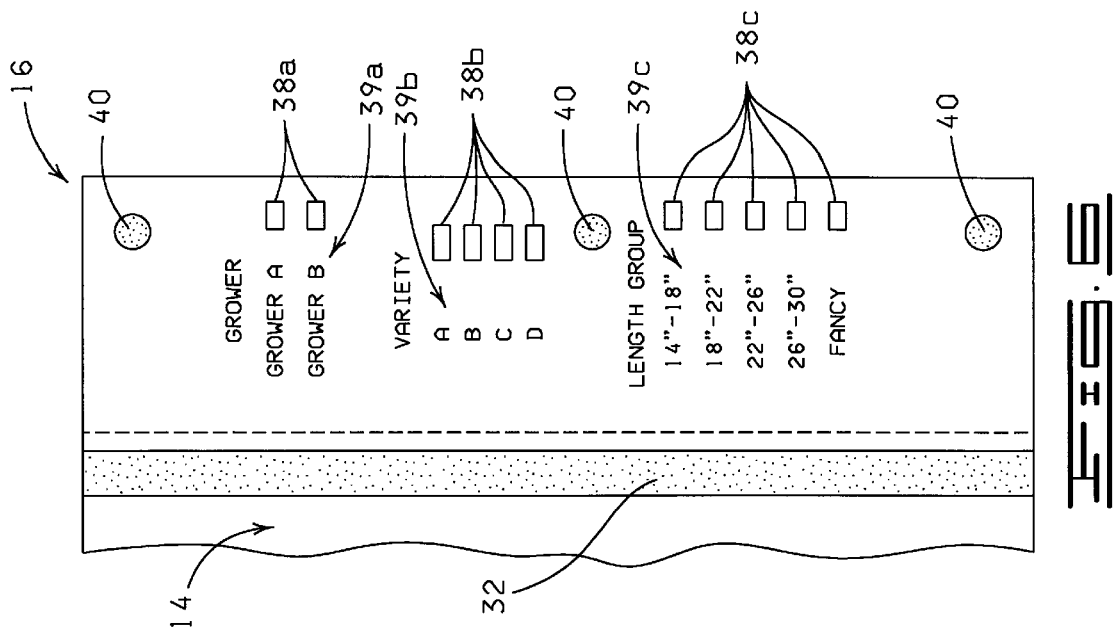
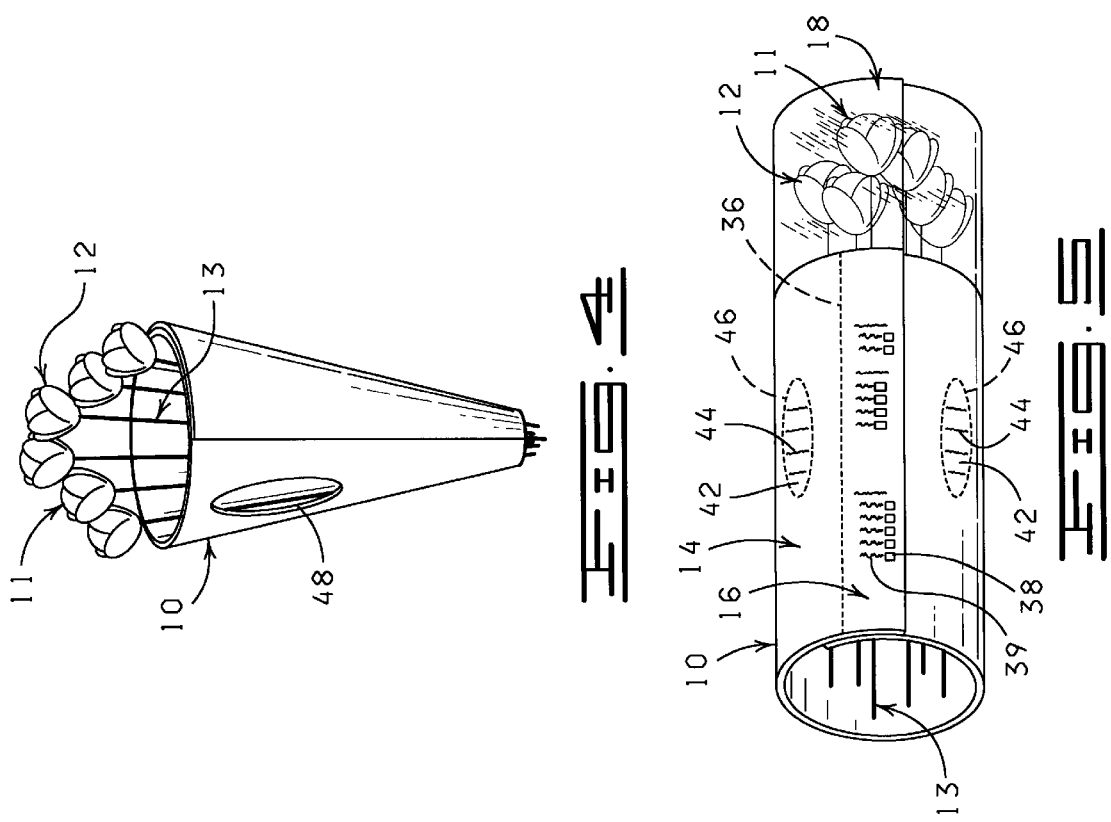

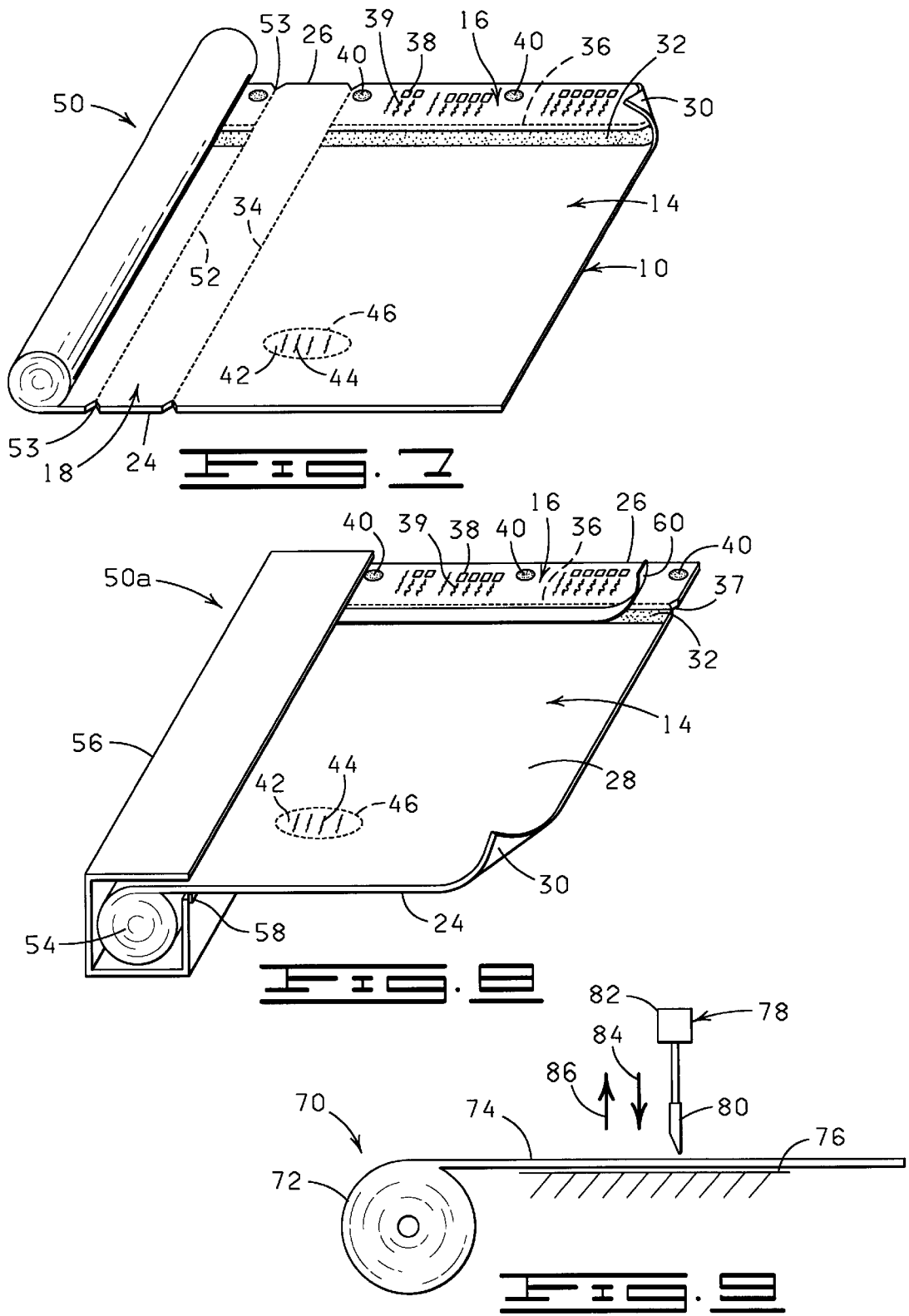

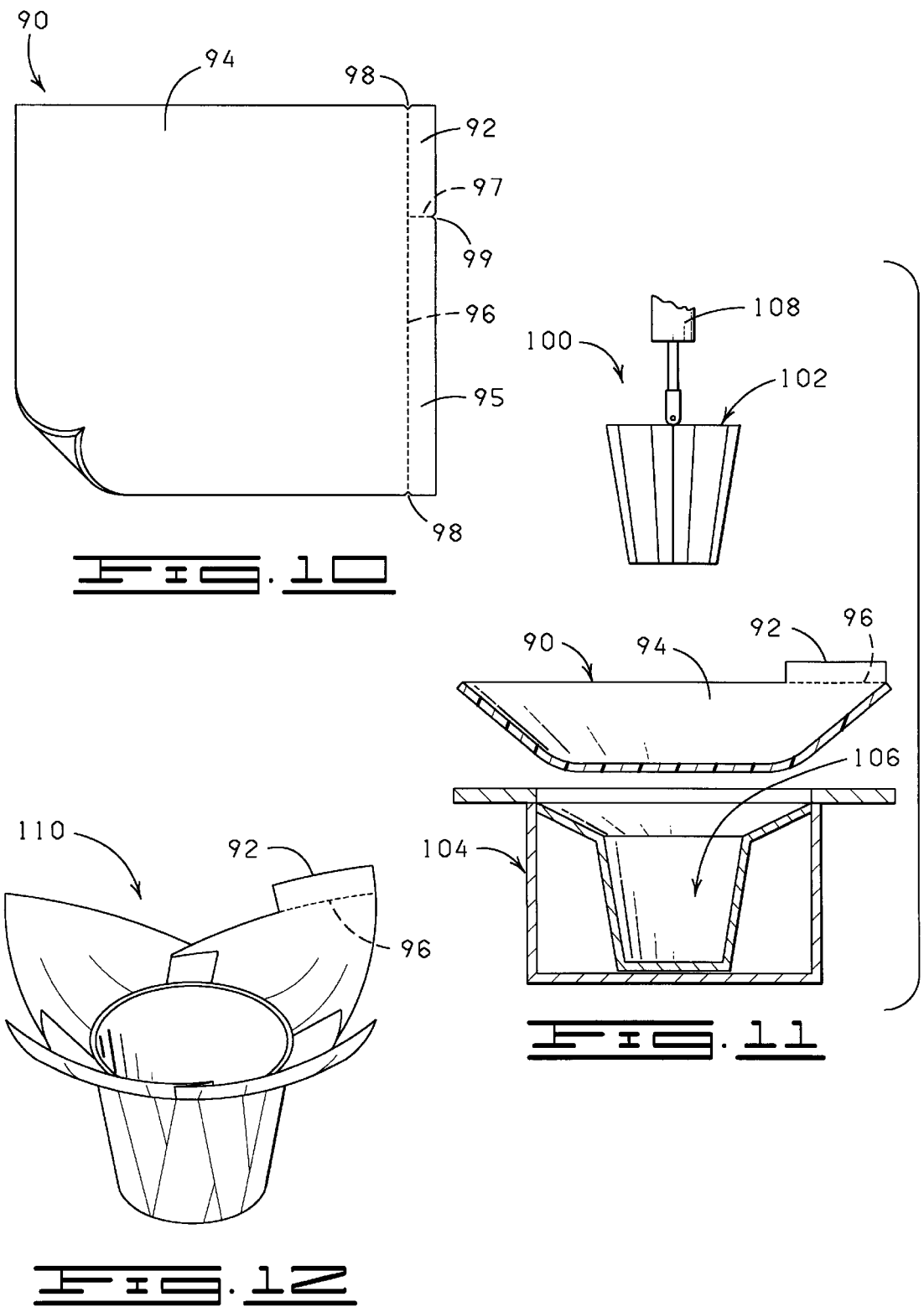

METHOD OF FORMING A FLOWER POT OR FLOWER POT COVER HAVING A LABEL INCORPORATED THEREIN

CROSS-REFERENCE TO RELATED APPLICATIONS

This application is a divisional of U.S. Ser. No. 08/429,255, filed Apr. 25, 1995, entitled SHEETS AND SHEET ROLLS OF WRAPPING MATERIAL HAVING INFORMATION SELECTABLE BY CHOICE BLOCKS now U.S. Pat. No. 5,807,224, which is a divisional of U.S. Ser. No. 08/234,198, filed Apr. 26, 1994, entitled METHOD OF WRAPPING A FLORAL GROUPING WITH A SHEET OF MATERIAL HAVING A PLURALITY OF CHOICE BLOCKS, now U.S. Pat. No. 5,533,319, which is a continuation of U.S. Ser. No. 08/068,482, filed May 28, 1993, entitled SHEETS AND SHEET ROLLS OF WRAPPING MATERIAL HAVING INFORMATION SELECTABLE BY CHOICE BLOCKS, now U.S. Pat. No. 5,335,476, which is a continuation-in-part of U.S. Ser. No. 07/979,510, filed Nov. 19, 1992, entitled PLANT CARE TAG SYSTEM, now abandoned, and a continuation-in-part of U.S. Ser. No. 07/965,585, filed Oct. 23, 1992, entitled WRAPPING A FLORAL GROUPING WITH SHEETS HAVING ADHESIVE OR COHESIVE MATERIAL APPLIED THERETO, now abandoned, which is a continuation of U.S. Ser. No. 07/893,586, filed Jun. 2, 1992, entitled WRAPPING A FLORAL GROUPING WITH SHEETS HAVING ADHESIVE OR COHESIVE MATERIAL APPLIED THERETO, now U.S. Pat. No. 5,181,364, which is a continuation of U.S. Ser. No. 07/707,417, filed May 28, 1991, entitled WRAPPING A FLORAL GROUPING WITH SHEETS HAVING ADHESIVE OR COHESIVE MATERIAL APPLIED THERETO, now abandoned, which is a continuation of U.S. Ser. No. 07/502,358, filed Mar. 29, 1990, entitled WRAPPING A FLORAL GROUPING WITH SHEETS HAVING ADHESIVE OR COHESIVE MATERIAL APPLIED THERETO, now abandoned, which is a continuation-in-part of U.S. Ser. No. 249,761, filed Sep. 26, 1988, entitled METHOD FOR WRAPPING AN OBJECT WITH A MATERIAL HAVING PRESSURE SENSITIVE ADHESIVE THEREON, now abandoned, which is a continuation-in-part of U.S. Ser. No. 219,083, filed Jul. 13, 1988, entitled ARTICLE FORMING SYSTEM, now U.S. Pat. No. 4,897,031, which is a continuation of U.S. Ser. No. 004,275, filed Jan. 5, 1987, entitled ARTICLE FORMING SYSTEM, now U.S. Pat. No. 4,773,182, which is a continuation of U.S. Ser. No. 613,080, filed May 22, 1984, entitled ARTICLE FORMING SYSTEM, now abandoned.

BACKGROUND OF THE INVENTION

1. Field of the Invention.

The present invention relates generally to sheet wrapping materials and particularly, but not by way of limitation, to sheets and sheet rolls of wrapping material for wrapping floral groupings and for being formed into flower pots and flower pot covers.

2. Brief Description of the Related Art.

Various wrappings for flowers and potted plants are known in the art. For example, U.S. Pat. Nos. 3,271,922 and 3,508,372 disclose a flexible paper sheet designed to be formed into a protective sleeve around flowers. A potted plant package disclosed by U.S. Pat. No. 4,413,725 has an upper sleeve portion which is removable to display the plant after shipment.

In addition to packaging the product, a vendor typically wishes to display certain information related to the product. Such information may be directed at prospective customers and may include eye-catching designs, illustrations, pricing, text descriptive of the item and instructional material. Other information, such as uniform product codes and bar codes used for pricing and inventory control, may be provided for processing the sale at the check-out counter. In the case of a gift item, such as a plant or floral grouping, it is usually desirable to remove such information before presenting the item as a gift.

BRIEF SUMMARY OF THE INVENTION

The present invention is directed at a method of forming a flower pot or a flower pot cover. The method includes the step of providing a sheet of material having an upper surface and a lower surface with at least one of the upper and lower surfaces being a bondably connectable surface. The sheet of material has a label area which has information related to a floral grouping displayed thereon. The method further includes forming the sheet of material into a base having a closed lower end, an open upper end, and an object opening extending through the open upper end and dimensioned to receive a flower pot in which the floral grouping is disposed. The base is formed to have a plurality of overlapping folds that are bondably connected so as to retain the base in a predetermined shape with the information on the label area being viewable when the flower pot is disposed in the object opening.

The objects, features and advantages of the present invention will become apparent from the following detailed description when read in conjunction with the accompanying drawings and appended claims.

BRIEF DESCRIPTION OF THE SEVERAL VIEWS OF THE DRAWING

FIG. 1 is a perspective view of a sheet of material constructed in accordance with the present invention and having a floral grouping disposed thereupon.

FIG. 2 is a perspective view of the floral grouping partially wrapped in the sheet of material of FIG. 1.

FIG. 3 is a perspective view of the floral grouping completely wrapped in the sheet of material of FIG. 1.

FIG. 4 is a perspective view of the floral grouping completely wrapped in the sheet of material of FIG. 1 after detachable portions of the sheet of material have been removed.

FIG. 5 is a perspective view of a floral grouping wrapped in the sheet of material of FIG. 1 in a cylindrical manner rather than the conical manner shown in FIGS. 1–4.

FIG. 6 is a plan view of a detachable label with a plurality of choice blocks of descriptive information.

FIG. 7 is a sheet roll of wrapping material constructed in accordance with the present invention.

FIG. 8 is an alternate embodiment of a sheet roll of wrapping material constructed in accordance with the present invention.

FIG. 9 is partly diagrammatical view of a sheet roll constructed in accordance with the present invention and a knife for cutting the sheet roll into individual wrapping sheets.

FIG. 10 is a sheet of material constructed in accordance with the present invention for being formed into a flower pot or flower pot cover.

FIG. 11 is a partly diagrammatical side view of an apparatus for forming the sheet of material of FIG. 10 into a flower pot or flower pot cover.

FIG. 12 is a perspective view of the sheet of material of FIG. 10 after being formed into a flower pot or flower pot cover.

DETAILED DESCRIPTION OF THE INVENTION

Referring to the drawings in general, and to FIG. 1 in particular, shown therein and designated by the general reference numeral 10 is a sheet of material for wrapping an item such as a floral grouping 11 having a bloom portion 12 and a stem portion 13. The sheet of material 10 includes a wrapping area 14, a label area 16 and a sleeve area 18.

As used herein, "floral grouping" means cut, fresh flowers, artificial flowers, a single flower, other fresh and/or artificial plants or other floral materials. It should be appreciated that a floral grouping may include other secondary plants and/or ornamentation which add to the aesthetics of the overall floral grouping.

The sheet of material 10 includes a first end 20, a second end 22, a first side 24 and a second side 26. The sheet of material 10 also includes an upper surface 28 and a lower surface 30. A closure bonding material 32 is disposed on the upper surface 28 of the sheet of material 10 in the wrapping area 14. As best shown in FIG. 1, the closure bonding material 32 extends from the second end 22 of the sheet of material 10 to the sleeve area 18 generally adjacent to the label area 16.

The sheet of material 10 is constructed from any suitable material that is capable of being wrapped about an item as described herein. Typically, the sheet of material 10 is constructed of a material selected from the group of materials consisting of paper (untreated or treated in any manner), cellophane, metal foil, cloth (natural or synthetic), denim, burlap, polymer films and combinations thereof.

As used herein, the term "polymer film" means any polymer film. For example, but not by way of limitation, one polymer film is a polypropylene film. Another example of a polymer film, but not by way of limitation, is cellophane.

The sheet of material 10 may be constructed of a single layer of material or a plurality of layers of the same or different types of materials. Any thickness of the material 10 may be utilized with the present invention as long as the material 10 is wrappable about an item. Typically, the sheet of material 10 has a thickness in a range from about 0.1 mils to about 5 mils. However, sheets of material 10 up to about 30 mils thick may be used.

Although the sheet of material 10 shown in FIG. 1 is rectangular, the sheet of material 10 may be any shape. For example, the sheet of material 10 may square, rectangular, circular or any other geometric shape. The shape of the sheet of material 10 may even have an irregular, capricious or decorative shape.

As used herein, the term "bonding material" means an adhesive, typically a pressure sensitive adhesive, or a cohesive. Where the bonding material is a cohesive, a similar cohesive material must be placed on the adjacent surface for bondingly contacting and bondingly engaging with the cohesive material. It should be appreciated that the term "bonding material" includes any type of material or thing which can be used to effect the bonding or connecting of the two adjacent portions of the material or sheet of material as described herein.

As illustrated by FIG. 1, the sleeve area 18 extends across the first end 20 of the sheet of material 10. As indicated by dashed line 34, the sheet of material 10 is perforated from the first side 24 to the second side 26 to make the sleeve area 18 readily detachable from the wrapping area 14 and the label area 16.

It should be appreciated that the sleeve area 18 may be made detachable in any suitable manner. For example, the sleeve area 18 may be made detachable by tear-notches, designated by reference numeral 35, at the intersection of the dashed line 34 with the first side 24 and/or second side 26. The sheet of material 10 may be partially cut or reduced in thickness along the dashed line 34 to facilitate tearing along the dashed line 34. With this construction, the tear notch or notches 35 may be used to start the tear. Then the partial cut or reduced thickness may guide the tear as the sleeve area 18 is torn from the remainder of the sheet of material 10.

The sleeve area 18 may also be made readily detachable with use of a bonding material. In utilizing a bonding material, the sleeve area 18 is a separate piece of material which is attached to the wrapping area 14 and the label area 16 by the bonding material along the dashed line 34. With this construction, the bonding material holding the sleeve area 18 to the rest of the sheet 10 should have sufficiently weak bonding strength to allow easy removal of the sleeve area 18.

In similar fashion, the label area 16 is also readily detachable, as indicated by dashed line 36 in FIG. 1. It should be appreciated that the label area 16 may be detachable by means of perforations or a tear notch 37 and tear line 36, similar to those described for the sleeve area 18. Moreover, the label area 16 may be a separate piece of material detachably connected to the wrapping area 14 and sleeve area 18 with a bonding material, as described for holding the sleeve area 18 to the rest of the sheet 10.

The label area 16 includes a plurality of choice blocks. One of the choice blocks is designated by reference numeral 38 and is generally representative of the plurality of choice blocks of the label area 16. Proximate to each choice block 38 is an area containing choice block information. One of the choice block information areas is designated by reference numeral 39 and is generally descriptive of the choice block information areas on the label area 16.

The choice blocks 38 and choice block information areas 39 of the label area 16 may appear on the upper surface 28 (as shown in FIG. 1) or on the lower surface 30 (as illustrated by FIGS. 3 and 5). If the choice blocks 38 and choice block information areas 39 are placed on the upper surface 28, the label area 16 may be bent back along the dashed line 36 to extend radially or angularly from the wrapping area 14 for visual display of the choice blocks 38 and choice block information areas 39.

If the choice blocks 38 and choice block information areas 39 are placed on the lower surface 30, it is desirable to maintain closure of the label area 16 against the wrapping area 14, as shown in FIGS. 3 and 5, to display the choice blocks 38 and choice block information areas 39. In order to effect this closure of the label area 16, a plurality of closure spots 40 are located on the upper surface 28 of the label area 16. A bonding material is disposed on each closure spot 40 to effect closure of the label area 16 against the wrapping area 14.

As shown in FIGS. 1 and 2, the closure spots 40 are spaced apart to provide non-closure areas between the closure spots 40. A pencil or one's fingers may be inserted with ease into the nonclosure areas between the label area 16 and the wrapping area 14 to break the hold of the closure spots 40 and to detach the label area 16.

In addition, the bonding material of the closure spots 40 may have weaker bonding strength than the closure bonding material 32 on the wrapping area 14. With this construction, the hold of the closure spots 40 may be broken and the label area 16 may be detached without disturbing the closure of the wrapping area 14 about the items or floral grouping 11.

The sheet of material 10 may also include one or more handle areas 42 located in an interior portion of the wrapping area 14. The handle areas 42 may display additional information 44 of the type placed upon the label area 16. As indicated by dashed lines 46, the outline of the handle area 42 may be perforated to allow the handle area 42 to be punched out or torn out from the sheet of material 10. Punching out the handle area 42 along the perforations 46 results in a carrying aperture 48, shown in FIG. 4, for grasping the wrapped floral grouping 11.

As illustrated by FIG. 5, two spaced apart handle areas 42 may be provided in the wrapping area 14 of the sheet of material 10. By punching out both handle areas 42, two carrying apertures 48 are made for grasping the wrapped sheet of material 10 between thumb and fingers.

To wrap a floral grouping 11 in the sheet of material 10, the floral grouping 11 is placed on the upper surface 28 of the wrapping area 14 of the sheet of material 10, as shown in FIG. 1. The first side 24 of the sheet 10 is extended around the floral grouping 11 to form a substantially conical shape, as illustrated by FIG. 2. Then the second side 26 of the sheet 10 is brought around from the opposite side to complete the formation of the substantially conical wrapping, as depicted in FIG. 3.

After wrapping the sheet 10 around the floral grouping 11, the closure bonding material 32 is pressed into engagement with a portion of the lower surface 30 of the wrapping area 14 to effect closure of the sheet of material 10 around the floral grouping 11. If desired, the label area 16 is also pressed into engagement with a portion of the lower surface 30 of the wrapping area 14. By doing so, the bonding material of the closure spots 40 bonds with the lower surface 30 of the wrapping area 14 to effect closure of the label area 16.

When the sheet 10 is wrapped around the floral grouping 11 as shown in FIG. 3, the sleeve area 18 defines a sleeve which supports and protects the bloom portion 12 of the floral grouping 11. Wrapped by the sheet of material 10 in this manner, the floral grouping 11 is protected from damage during shipment, sales display and carrying by the customer.

As shown in FIG. 4, the sleeve area 18, the handle areas 42 and the label area 16 may be easily detached from the sheet of material 10 for displaying the floral grouping 11 or for presenting the floral grouping 11 as a gift. Of course, it is not necessary to remove the sleeve area 18, the handle areas 42 and the label area 16 at all. Moreover, the sleeve area 18, the handle areas 42 and the label area 16 may be detached at different times and for various reasons.

For example, one handle area 42 may be removed by sales personnel at the time of the sale to scan a uniform product code on the handle area 42 through a bar code reader. The handle area 42 punched out by the sales clerk defines a first carrying aperture 48. The other handle area 42 may be punched out by the customer to provide a second carrying aperture 48 for grasping the wrapped material 10. Finally, the sleeve area 18 and label area 16 may be detached by the customer immediately before presenting the floral grouping 11 as a gift.

As illustrated by FIG. 5, the sheet of material 10 may be wrapped around the floral grouping 11 in a substantially cylindrical manner instead of the generally conical shape described hereinabove. It should be appreciated that the cylindrically wrapped sheet 10 possesses the same features and benefits described hereinabove for the conically wrapped sheet 10.

An additional feature of the sheet of material 10 is shown in FIG. 5. The sleeve area 18 may be constructed from a substantially transparent material to allow viewing the bloom portion 12 of the floral grouping 11 through the sleeve area 18. It should be appreciated, however, that the wrapping area 14, the sleeve area 18, the handle areas 42 and the label area 16 may be made of materials which are completely or partially opaque or transparent. In addition, one or more of these areas may be uniform in color or may have many colors and decorative patterns or designs.

Referring now to FIG. 6, shown therein is the detachable label 16 with the choice blocks 38 and choice block information areas 39. In this particular example, the choice blocks 38 and choice block information areas 39 are designed to provide information about a floral grouping. It should be appreciated, however, that choice blocks 38 and choice block information areas 39 may be provided for whatever type of item is to be wrapped in the sheet of material.

The choice blocks 38 shown in FIG. 6 are divided into three sets. The upper set of choice blocks 38a lists possible growers 39a of the plant, the middle set of choice blocks 38b presents various varieties 39b of the plant and the lower set of choice blocks 38c displays several length groups 39c to which the plant may belong.

Sheets of material 10 with the label 16 may be utilized in several ways. Of course, appropriate choice blocks 38 may be selected on each sheet of material one by one. The desired choice blocks 38 may be selected by marking one of the choice blocks 38 in each set of choice blocks 38 with a marking instrument, by punching out the desired choice blocks 38 with a hole-punch, by notching the edge of the label 16 proximate to the appropriate choice blocks 38, or in any other suitable manner.

The selection of choice blocks 38 may be indicated in ways other than by punching or marking. For example, the choice blocks 38 may be treated with a light-activatable ink, which changes in color or shade when exposed to a certain type of light. The desired choice blocks 38 may then be indicated by exposing those choice blocks 38 only to the particular type of activating light.

Similarly, the choice blocks 38 may be treated with a heat-activatable ink, which changes in color or shade when exposed to heat. In using heat-activatable ink, the choice blocks 38 are selected by exposing only the desired choice blocks 38 to heat. Furthermore, a chemical-activatable ink and selective application of a chemical to the choice blocks 38 may be utilized.

It should be appreciated that any of these inks may be applied to the choice blocks 38 before, after or during the manufacture of the sheets of material 10. It should also be understood that such inks may be disposed upon the sheets of material 10 or incorporated into the material.

Besides selecting the choice blocks 38 on one sheet 10 at a time, choice blocks 38 for entire stacks of sheets 10 may be selected at one time with a conventional hole-punch machine (not shown). This method is advantageous, for example, where a quantity of sheets of material 10 are needed and all the sheets 10 should have choice blocks 38 selected to indicate one particular grower, plant variety and length group. A conventional multiple hole-punch machine may be set to punch holes through the desired choice blocks 38 of the sheets of material 10. In this manner, a quantity of sheets 10 may be punched out at one time and are available for wrapping a quantity of plants associated with the punched-out choice blocks 38.

Sheets of wrapping material 10 having detachable labels 16 with choice blocks 38 provide several benefits. First, the same sheets 10 may be used for multiple growers, plant varieties and length groups. The appropriate information is indicated by marking or punching the choice blocks 38. This construction greatly reduces the cost of producing large numbers of different or custom labels.

Secondly, the labels 16 are attached to the sheet of wrapping material 10. By being a part of the sheet 10, separate labels and tags are not needed. Separate tags may be disadvantageous in that they require individual attachment and may become separated from the wrapping and the item wrapped.

A third benefit of the sheets 10 is that the label 16 may be removed whenever desired. If the choice block information 39 is primarily directed to the vendor of the item wrapped, then it may be desirable to remove the label 16 before displaying the item for sale. If the choice block information 39 includes information directed to the customer, then it may be preferable to leave the label 16 attached to the sheet 10 and allow the customer to remove the label 16 if desired.

With reference now to FIG. 7, shown therein and designated by reference numeral 50 is a sheet roll of wrapping material. The sheet roll 50 is made up of a plurality of sheets 10 of wrapping material connected together to form the continuous sheet roll 50.

A perforated line or tear line, indicated by dashed line 52, connects each sheet 10 to the next sheet 10 and allows the sheets 10 to be detached from one another. The perforated line or tear line 52 may have a tear notch 53 at the sides 24 and 26 of the sheets 10. The bonding material 32 on the wrapping area 14 and the label closure spots 40 may be a cohesive material rather than an adhesive material to prevent the sheets 10 from adhering to one another in the sheet roll 50.

In order for cohesive bonding material to effect closure of the wrapping area 14 and the label area 16, an area of cohesive bonding material is disposed on the lower surface 30 of each sheet 10. The area of cohesive bonding material on the lower surface 30 of each sheet 10 is located to make cohesive contact with the bonding material 32 of the wrapping area 14 and the label closure spots 40 when the sheet 10 is wrapped around items as described hereinabove.

Referring now to FIG. 8, shown therein and designated by reference numeral 50A is a roll 54 of sheets 10 of wrapping material disposed in a sheet dispenser 56. The dispenser 56 includes a saw-tooth edge 58 for tearing off individual sheets 10 from the roll 54.

As illustrated by FIG. 8, the bonding material 32 on the wrapping area 14 may be an adhesive material. A non-adhesive backing 60 may be disposed over the adhesive bonding material 32 to prevent the layers of sheet material from adhering to one another or to the dispenser 56. The non-adhesive backing 60 is removed before wrapping an item so that the bonding material 32 will adhere to the lower surface 30 of the sheet 10 and effect closure of the sheet 10 around the item.

It should be appreciated that the bonding material of the label closure spots 40 may also be an adhesive substance and that a non-adhesive backing may be used to cover the closure spots 40 when the sheets 10 are rolled up. One strip of non-adhesive material having sufficient width may be used to cover the bonding material on the wrapping area 14 and on the closure spots 40.

With reference now to FIG. 9, shown therein is a system 70 for cutting individual sheets 10 of material from a continuous roll 72 of sheet material 74. The system 70 includes the continuous roll 72, a cutting surface 76 and a cutting knife assembly 78.

The roll 72 of sheet material 74 is supported and adapted for rotation in a conventional manner to feed sheet material 74 over the cutting surface 76. The cutting knife assembly 78 comprises a cutting blade 80 and a conventional mechanism 82 to drive reciprocating movement of the blade 80 as indicated by direction arrows 84 and 86.

It should be appreciated that the system 70 includes suitable control and timing mechanisms (not shown) for metering the sheet material 74 from the roll 72 and for coordinating the movement of the cutting blade 80 to cut off individual sheets 10 of a desired size.

Depending on the type of sheet material 74 and the sharpness of the cutting blade 80, the driving mechanism 82 should direct the cutting blade 80 against the sheet material 74 with sufficient force to cut the material cleanly and completely.

Referring now to FIG. 10, shown therein and designated by reference character 90 is a sheet of material for being formed into a flower pot or flower pot cover and having a detachable label 92. The sheet of material 90 may include any combination of the substances and features for sheets of material described hereinabove.

The sheet of material 90 may have virtually any shape which can be formed into a flower pot or flower pot cover. The rectangular sheet 90 shown in FIG. 10 is only one of many examples of the shape which the sheet 90 may have.

The sheet of material 90 includes a main area 94, the label area 92 and a discard area 95. One perforated line or tear line 96 separates the main area 94 from the label area 92 and the discard area 95. Another perforated line or tear line 97 is located between the label area 92 and discard area 95. A tear notch 98 may be provided at either end or at both ends of the perforated line or tear line 96 as a starting aid in tearing off the label area 92 and discard area 95. Another tear notch 99 may be provided to start the tear along the line 97 for separating the discard area 95 from the label area 92.

Turning now to FIG. 11, shown therein and designated by reference numeral 100 is an apparatus for forming the sheet 90 into a flower pot or flower pot cover. The apparatus 100 includes a male mold 102, a female mold 104 having a female opening 106 and a mechanism 108 connected to the male mold 102 for moving the male mold 102 into the female opening 106.

As illustrated by FIG. 11, the discard area 95 of the sheet 90 is typically removed before forming the sheet 90 of material into a flower pot or flower pot cover. The label area 92, however, is left as a part of the sheet 90.

To form the sheet of material into a flower pot or flower pot cover, the sheet 90 of material is disposed over the female opening 106 with the male mold 102 spaced a distance from the female opening 106. Then the male mold 102 is moved into the female opening 106.

As the male mold 102 is moved into the female opening 106, the sheet 90 of material is forced into the female opening 106 and is formed into a flower pot or flower pot cover between the male mold 102 and the female mold 104.

After the forming process, the male mold 102 is withdrawn from the female opening 106. The male mold 102 may be provided with an air/vacuum system so that the flower pot or flower pot cover may be withdrawn from the female opening 106 with the male mold 102. U.S. Pat. No. 4,897,031, entitled "Article Forming System" and issued Jan. 30, 1990 to Weder et al., discloses a suitable forming system with air/vacuum and is hereby incorporated by reference.

A flower pot or flower pot cover 110 formed from the sheet of material 90 is illustrated by FIG. 12. It should be appreciated that the label 92 is a removable part of the sheet 90 throughout the forming process. Accordingly, the flower pot or flower pot cover 110 formed from the sheet 90 already includes the detachable label 92. Thus the flower pot or flower pot cover 110 is ready for display without having to affix additional tags or labels.

The label 92 may include any combination of choice blocks 38 and choice block information areas 39 as described hereinabove. For example, the label area 92 typically includes the three sets of choice blocks 38a, 38b and 38c with information areas 39a, 39b and 39c previously described.

It should be appreciated that the flower pot or flower pot cover 110 with detachable label 92 may be made in a wide variety of shapes and styles. The particular shape and style of flower pot or flower pot cover 110 shown in FIG. 12 is but one example. By altering the shape of the sheet 90 or the configuration of the male mold 102 and female opening 106, various styles and shapes of flower pots or flower pot covers 110 having detachable labels 92 may be formed.

Changes may be made in the combinations, operations and arrangements of the various parts and elements described herein without departing from the spirit and scope of the invention as defined in the following claims.

What is claimed is:

1. A method of forming a flower pot cover, comprising the steps of:

providing a sheet of material having an upper surface and a lower surface with at least one of the upper and lower surfaces being a bondably connectable surface, the sheet of material having a label area, the label area having information related to a floral grouping displayed thereon; and forming the sheet of material into a base having a closed lower end, an open upper end, and an object opening extending through the open upper end and dimensioned to receive a flower pot in which the floral grouping is disposed, the base formed to have a plurality of overlapping folds that are bondably connected so as to retain the base in a predetermined shape with the information on the label area being viewable on a portion of the base to provide information concerning the floral grouping disposed in the flower pot when the flower pot is disposed in the object opening of the base.

2. The method of claim 1 wherein the label area of the sheet of material is detachable from the base.

3. A method of forming a flower pot cover, comprising the steps of:

providing a sheet of material having an upper surface and a lower surface with at least one of the upper and lower surfaces being a bondably connectable surface, the sheet of material having a label area, the label area having information related to a floral grouping displayed thereon; and forming the sheet of material into a base having a skirt extending upwardly therefrom, the base having a closed lower end, an open upper end, and an object opening extending through the open upper end dimensioned to receive a flower pot in which the floral grouping is disposed, the skirt adapted to extend beyond an upper end of the flower pot when the flower pot is disposed in the object opening, the base formed to have a plurality of overlapping folds between the upper end and the lower end that are bondably connected so as to retain the base in a predetermined shape with the information on the label area being viewable on a portion of the base to provide information concerning the floral grouping disposed in the flower pot when the flower pot is disposed in the object opening of the base.

4. The method of claim 3 wherein the base is formed so that the label area extends from the skirt of the base.

5. The method of claim 3 wherein the label area of the sheet of material is detachable from the base.

6. The method of claim 5 wherein the base is formed so that the label area extends from the skirt of the base.

* * * * *

UNITED STATES PATENT AND TRADEMARK OFFICE
CERTIFICATE OF CORRECTION

PATENT NO.    : 5,934,044
DATED         : August 10, 1999
INVENTOR(S)   : Donald E. WEDER

It is certified that error appears in the above-identified patent and that said Letters Patent is hereby corrected as shown below:

Cover Page

After entry of the "Assignee" and before entry of the "Appl. No.", insert

--*   Notice:   This patent is subject to a Terminal Disclaimer.--

Signed and Sealed this

Tenth Day of April, 2001

Attest:

NICHOLAS P. GODICI

*Attesting Officer*    *Acting Director of the United States Patent and Trademark Office*